United States Patent
Fujiwara et al.

(10) Patent No.: US 12,554,406 B2
(45) Date of Patent: Feb. 17, 2026

(54) MEMORY CONTROL APPARATUS AND MEMORY CONTROL METHOD

(71) Applicant: CANON KABUSHIKI KAISHA, Tokyo (JP)

(72) Inventors: Makoto Fujiwara, Tokyo (JP); Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/628,881

(22) Filed: Apr. 8, 2024

(65) Prior Publication Data
US 2024/0345738 A1 Oct. 17, 2024

(30) Foreign Application Priority Data

Apr. 14, 2023 (JP) .................................. 2023-066620
Dec. 13, 2023 (JP) .................................. 2023-210283

(51) Int. Cl.
*G06F 3/06* (2006.01)
*G11C 11/406* (2006.01)

(52) U.S. Cl.
CPC .......... *G06F 3/0613* (2013.01); *G06F 3/0659* (2013.01); *G06F 3/0673* (2013.01); *G11C 11/40618* (2013.01); *G11C 11/40622* (2013.01)

(58) Field of Classification Search
CPC .... G06F 3/0613; G06F 3/0659; G06F 3/0673; G11C 11/40618; G11C 11/40622
See application file for complete search history.

(56) References Cited

U.S. PATENT DOCUMENTS

| 11,842,079 B2 | 12/2023 | Ito et al. |
| 2010/0128547 A1* | 5/2010 | Kagami ............ G11C 11/40622 365/230.03 |
| 2024/0211173 A1* | 6/2024 | Balakrishnan ........ G06F 3/0659 |

FOREIGN PATENT DOCUMENTS

JP  2021047829 A  3/2021

OTHER PUBLICATIONS

Chang, Kevin Kai-Wei, et al. "Improving DRAM performance by parallelizing refreshes with accesses." 2014 IEEE 20th International Symposium on High Performance Computer Architecture (HPCA). IEEE, 2014. (Year: 2014).*
Co-pending U.S. Appl. No. 18/626,390 of Hirata et al. filed on Apr. 4, 2024.

* cited by examiner

Primary Examiner — Nicholas J Simonetti
(74) Attorney, Agent, or Firm — Venable LLP

(57) ABSTRACT

A memory control apparatus that controls access to a DRAM including a plurality of banks, the apparatus comprising: a first generation unit that generates an access command in response to an access request to the DRAM and stores the access command in a buffer; a second generation unit that generates a refresh request specifying a bank to the DRAM; and an issuance unit that issues a DRAM command to the DRAM, based on the access command stored in the buffer and the refresh request generated by the second generation unit, wherein the second generation unit determines a target bank of the refresh request from among banks remaining after excluding, from the plurality of banks, a bank that is an access target of the access command stored in the buffer and having a dependency relationship that needs to maintain issuance order.

14 Claims, 14 Drawing Sheets

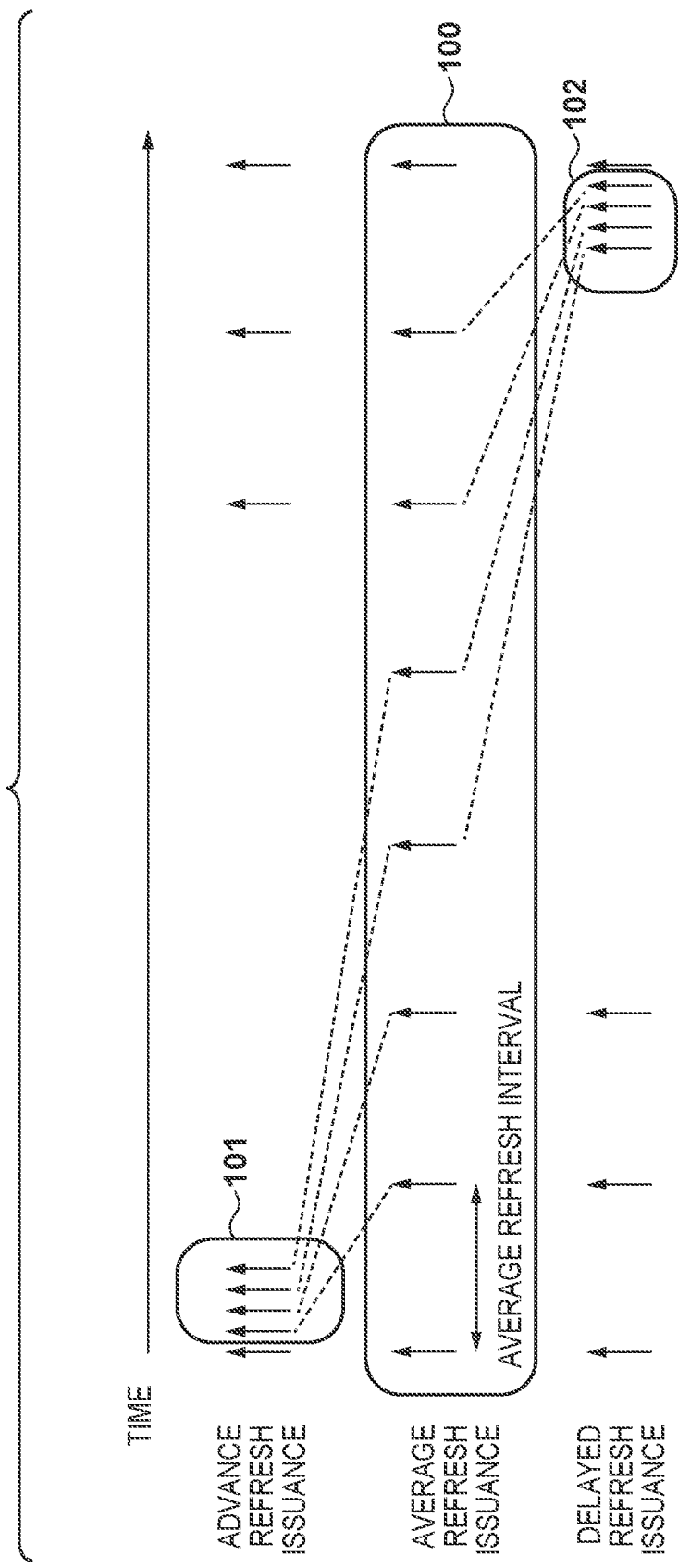

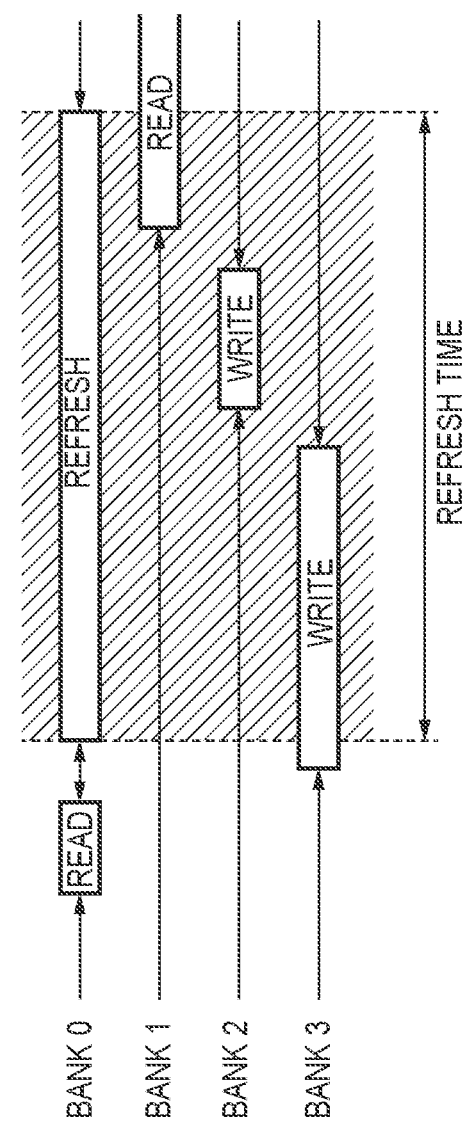
F I G. 2A
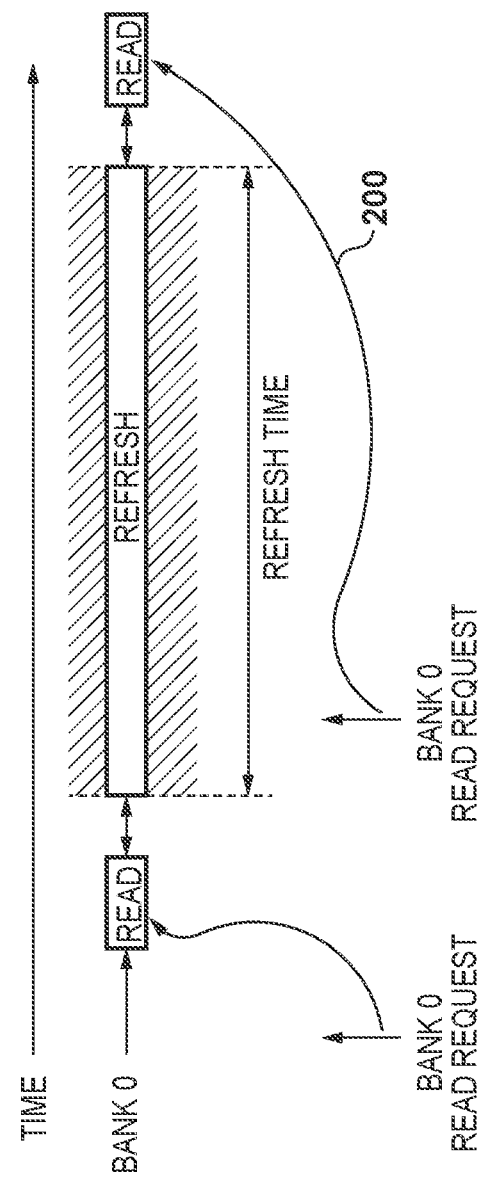
F I G. 2B

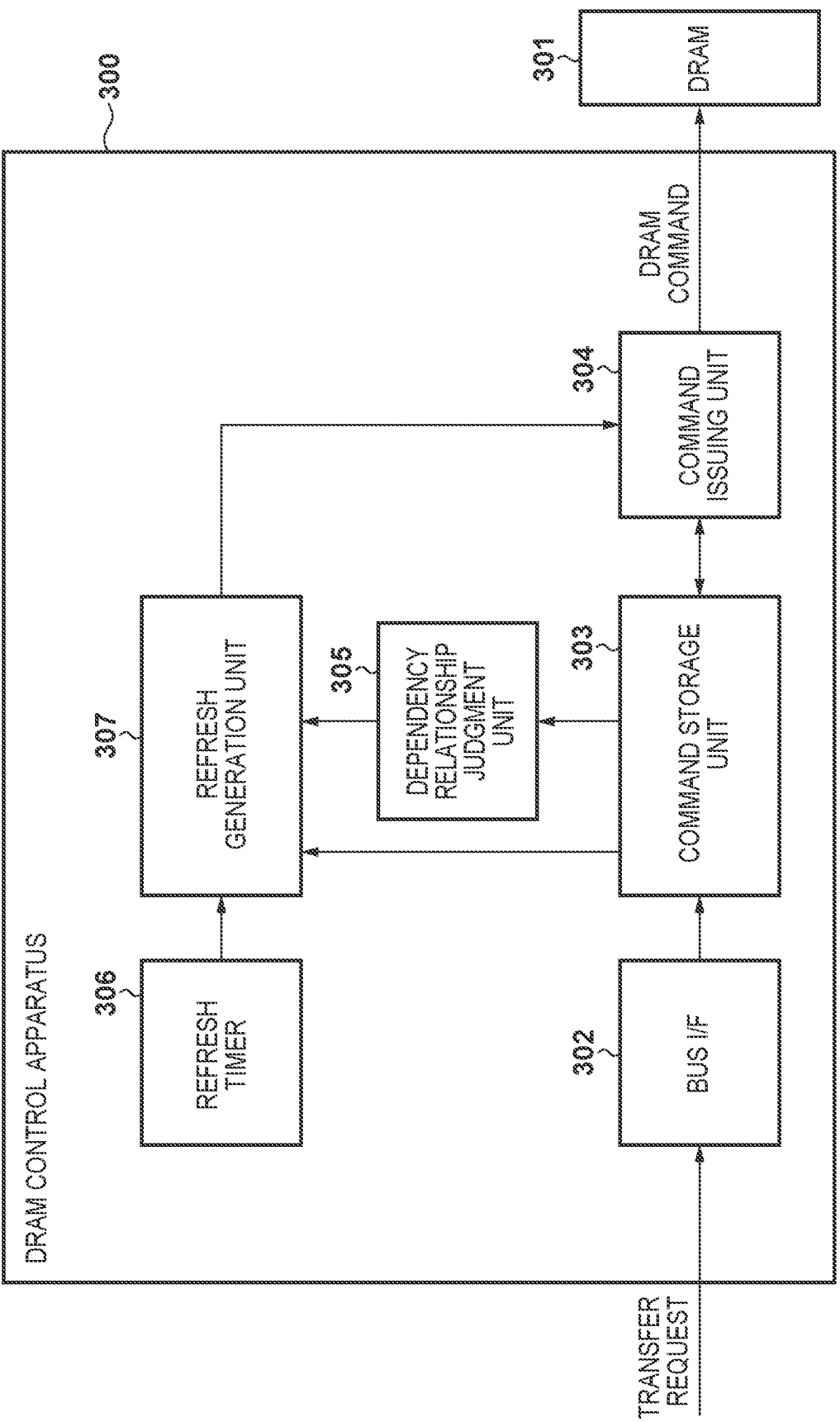

FIG. 4

COMMAND Queue

| | | | | |
|---|---|---|---|---|
| ACCESS TYPE | READ | READ | WRITE | WRITE |
| BANK | 0 | 3 | 2 | 1 |
| ROW ADDRESS | R0 | R1 | R2 | R1 |
| COLUMN ADDRESS | C0 | C1 | C2 | C1 |
| TRANSFER LENGTH | 16 | 64 | 16 | 128 |
| TRANSFER ID | ID0 | ID0 | ID0 | ID3 |

401 — ACCESS TYPE
402 — BANK
403 — ROW ADDRESS
404 — COLUMN ADDRESS
405 — TRANSFER LENGTH
406 — TRANSFER ID
407, 408

FIG. 6

REFRESH MANAGEMENT TABLE

| BANK | FLAG |
|---|---|
| 0 | 0 |
| 1 | 0 |
| 2 | 0 |
| 3 | 0 |
| 4 | 0 |
| 5 | 0 |
| 6 | 0 |
| 7 | 0 |

↑ BANK 2 REFRESH

| BANK | FLAG |
|---|---|
| 0 | 0 |
| 1 | 0 |
| 2 | 1 |
| 3 | 0 |
| 4 | 0 |
| 5 | 0 |
| 6 | 0 |
| 7 | 0 |

↑ BANK 0 REFRESH

| BANK | FLAG |
|---|---|
| 0 | 1 |
| 1 | 0 |
| 2 | 1 |
| 3 | 0 |
| 4 | 0 |
| 5 | 0 |
| 6 | 0 |
| 7 | 0 |

FIG. 9

| BANK | ACCESS TYPE·TRANSFER ID (901) | COMMAND SUM TOTAL (902) | COMMAND SUM TOTAL OF OTHER BANKS (903) | PRIORITY ORDER BASED ON COMMAND SUM TOTAL (904) | BANK EXCLUDED FROM REFRESH CANDIDATES (905) | REFRESH PRIORITY (906) |
|---|---|---|---|---|---|---|
| 0 | READ:0 WRITE:3 | 5 | 54 | 4 | ✓ | |
| 1 | WRITE:1 | 10 | 49 | | | |
| 2 | | 0 | 59 | 1 | | 1 |
| 3 | READ:3 | 7 | 52 | 5 | | 3 |
| 4 | WRITE:0 | 12 | 47 | | | |
| 5 | READ:0 | 2 | 57 | 2 | ✓ | |
| 6 | WRITE:2 | 3 | 56 | 3 | | 2 |
| 7 | READ:2 READ:4 | 20 | 39 | | | |

NUMBER READ COMMANDS/WRITE COMMANDS THAT CAN BE ISSUED IN PARALLEL TO REFRESH = 50

MEMORY CONTROL APPARATUS AND MEMORY CONTROL METHOD

BACKGROUND OF THE INVENTION

Field of the Invention

The present invention relates to a memory control apparatus and a memory control method.

Description of the Related Art

Dynamic Random Access Memory (DRAM) is widely employed as the main storage apparatus of a computer system. In response to increasing demand for higher DRAM access performance due to the increased speed and enhanced functionality of computer systems, DRAMs that can operate at a higher speed are being developed. The DRAM is a memory device that requires refresh (memory preserving operation) in order to keep holding the data. A DRAM conforming to the DDR2 or earlier standards periodically and simultaneously performs refresh on all the banks, and memory access during refresh is prohibited, which often causes degradation of the memory access performance. In order to suppress the degradation of the memory access performance caused by the refresh, a function of performing the refresh for each bank of the DRAM is added to the LPDDR2 standard. In addition, a function to specify a refresh bank in performing the refresh for each bank is added to the LPDDR4 standard. In Japanese Patent Laid-Open No. 2021-047829, a configuration is disclosed in which a memory controller that controls a memory including a plurality of banks selects a bank to perform refresh in accordance with a state of memory access to the bank. According to Japanese Patent Laid-Open No. 2021-047829, degradation of memory access efficiency caused by the refresh is reduced or prevented.

Account memory access having an execution order constraint is not considered in the control method of the refresh disclosed in Japanese Patent Laid-Open No. 2021-047829. Thus, when the memory access having the execution order constraint is executed, a bank that needs refresh may coincide with a bank that is the memory access target having the execution order constraint. When the refresh is performed on the bank that is a target for the memory access having the execution order constraint, execution of the access command under constraint is made to wait, and thus the memory access performance is degraded.

SUMMARY OF THE INVENTION

The present invention, which has been made in view of the aforementioned problems, provides a refresh control that enables more efficient memory access.

According to one aspect of the present invention, there is provided a memory control apparatus configured to control access to a DRAM including a plurality of banks, the memory control apparatus comprising: a first generation unit configured to generate an access command in response to an access request to the DRAM, and store the access command in a buffer; a second generation unit configured to generate a refresh request specifying a bank to the DRAM; and an issuance unit configured to issue a DRAM command to the DRAM, based on the access command stored in the buffer and the refresh request generated by the second generation unit, wherein the second generation unit determines a target bank of the refresh request from among banks remaining after excluding, from the plurality of banks, a bank that is an access target of the access command stored in the buffer and having a dependency relationship that needs to maintain issuance order.

Further features of the present invention will become apparent from the following description of exemplary embodiments (with reference to the attached drawings).

BRIEF DESCRIPTION OF THE DRAWINGS

FIG. 1 is an explanatory diagram illustrating refresh issuance of a DRAM according to a first embodiment;

FIG. 2A and FIG. 2B are explanatory diagrams illustrating a refresh specifying a bank according to the first embodiment;

FIG. 3 is a diagram illustrating a configuration of a DRAM control apparatus according to the first embodiment;

FIG. 4 is a diagram illustrating an example of an access command in row address units according to the first embodiment;

FIG. 6 is a diagram illustrating an example of a refresh management table according to the first embodiment;

FIG. 9 is an explanatory diagram illustrating a determination method of a refresh candidate according to the first embodiment;

DESCRIPTION OF THE EMBODIMENTS

Figure 5:
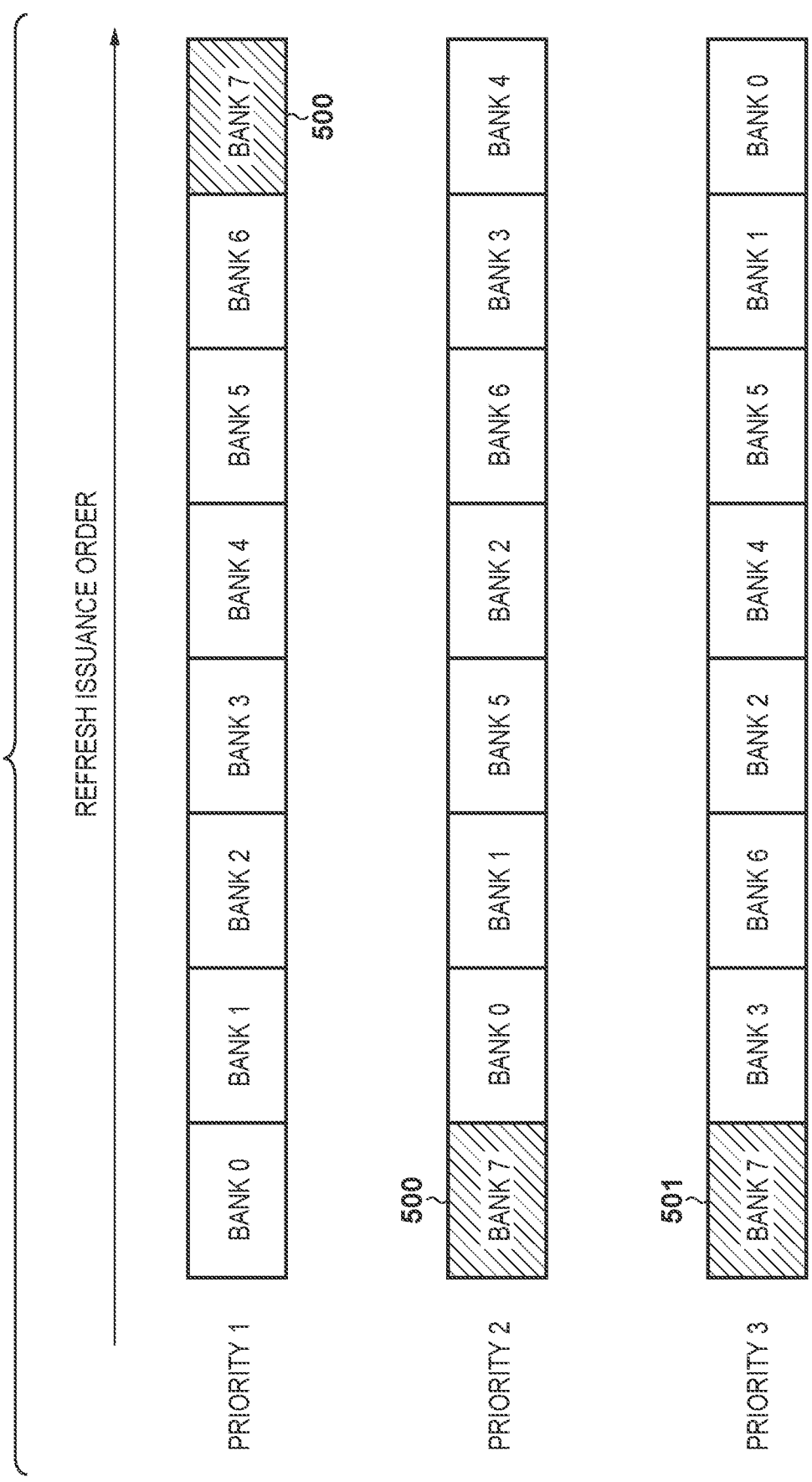
FIG. 5 is an explanatory diagram illustrating a constraint on a refresh request specifying a bank according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the first embodiment, a DRAM control apparatus that controls DRAM access conforming to the LPDDR4 standard will be described as an example of a memory control apparatus.

<Refresh of DRAM>

First, the refresh operation required for a DRAM to keep preserving data will be described. FIG. 1 is an explanatory diagram of refresh issuance of the DRAM.

The DRAM can preserve data by performing a refresh once at an average refresh interval defined in specification as an average refresh issuance 100. A common command signal is used for DRAM refresh and memory access. Further, since there are many timing constraints on command issuance in addition to refresh, it is difficult to constantly perform refresh at the average refresh interval.

Here, the DRAM allows for issuing a refresh ahead of the timing of an average refresh issuance as an ahead-of-time refresh issuance 101. In addition, the DRAM also allows for issuing refresh later than the timing of an average refresh issuance as delayed refresh issuance 102. The number of refreshes allowed for ahead-of-time issuance and the number of refreshes allowed for delayed issuance are specified in the specification, and the DRAM control apparatus can change the timing of refresh issuance within the tolerable range.

FIG. 2A and FIG. 2B are explanatory diagrams illustrating a refresh specifying a bank. In FIG. 2A, a refresh specifying a bank 0 is illustrated. During the execution of a refresh for the specified bank, the refresh specifying a bank allows memory access to the other banks for read operation or write operation. On the other hand, as illustrated in FIG. 2B, memory access to the bank during the execution of a refresh is prohibited. Therefore, upon occurrence of a memory access request to a refresh bank, the memory access will be performed after completion of the refresh (see arrow 200). As such, during a refresh of a certain bank, a refresh specifying a bank allows memory access to the other banks. In order to use the memory band more efficiently, however, it is necessary to control to prevent overlapping of a bank for which a refresh is performed and a bank for which a memory access is requested.

Apparatus Configuration

FIG. 3 is a diagram illustrating an exemplary configuration of a DRAM control apparatus according to the present embodiment. A DRAM control apparatus 300 issues a DRAM command to a DRAM 301 in response to a memory access request issued by an initiator (not illustrated).

A bus interface (referred to as a bus I/F in the following) 302 receives the memory access request issued by the initiator, converts the memory access request to an access command in row address units specifying a region referred to as a page of the DRAM 301, and transmits the access command to a command storage unit 303. The command storage unit 303 includes a buffer configured to hold a plurality of access commands generated by the bus I/F 302. When an access command is stored in the buffer, the command storage unit 303 notifies a command issuance unit 304 that command transmission is ready, and in response to a response from the command issuance unit 304, the command storage unit 303 transmits the access command to the command issuance unit 304. Here, the command storage unit 303 may be configured to change the order of the received memory access requests, for the purpose of improving the efficiency of DRAM access or realizing memory access requests depending on the degree of urgency. In addition, the change may be realized by changing the order of storing the access commands in the buffer.

A dependency relationship judgment unit 305 monitors the access commands stored in the command storage unit 303 and judges a dependency relationship between access commands. The dependency relationship between access commands will be described below, referring to FIG. 4. A refresh timer 306 is a timer that counts an elapsed time of an average refresh period and notifies the elapsed time of the average refresh period to a refresh generation unit 307. The refresh generation unit 307 generates a refresh request specifying a bank based on information received from the dependency relationship judgment unit 305 and the refresh timer 306, and it notifies the refresh request specifying the bank to the command issuance unit 304.

The command issuance unit 304 generates a DRAM access command for accessing the DRAM 301, from the access command in row address units received from the command storage unit 303. In addition, the command issuance unit 304 generates a refresh command for performing a refresh on the DRAM 301, in response to the refresh request for each bank generated by the refresh generation unit 307. In addition, the command issuance unit 304 adjusts the timings of issuing the DRAM access command and the refresh command, and it then issues the DRAM command to the DRAM 301.

FIG. 4 is a diagram illustrating an example of an access command in row address units stored in the command storage unit 303. An access command includes an access type 401, a bank 402, a row address 403, a column address 404, a transfer length 405, and a transfer ID 406. The access type 401 indicates whether the access command is read access or write access. The bank 402 indicates a bank to be accessed by the access command. The row address 403 and the column address 404 indicate a row address and a column address to be accessed by the access command. In the following, the row address 403 and the column address 404 will be collectively referred to as address information. The transfer length 405 and the transfer ID 406 are attribute information provided by an initiator (not illustrated). The transfer length 405, which is also referred to as a burst length, indicates a length of data read from the DRAM 301 or written to the DRAM 301 by memory access. Generally, 16 bursts per one access command (i.e., two bytes per one burst) are transferred. Therefore, 16 bursts will be transferred when the transfer length 405 is "16", and 64 bursts will be transferred when the length is "64".

The transfer ID 406 is information added when an initiator (not illustrated) issues a memory access request. For example, in a case where the initiator executes a plurality of tasks and issues memory access in each task, the relation between the memory access and the task can be recognized by adding a different transfer ID to each task. The command storage unit 303 stores a plurality of access commands in row address units, and each of the access commands is added with a transfer ID. Accordingly, the dependency relationship judgment unit 305 can recognize the dependency relationship between access commands by analyzing the information stored in the command storage unit 303. In the present embodiment, the access commands in a dependency relationship are access commands for which issuance order needs to be maintained. The dependency relationship judgment unit 305 can judge access commands having a same transfer ID (dotted line 408) to be the access commands in a dependency relationship. Alternatively, the dependency relationship judgment unit 305 may judge that access commands (dotted line 407) having a same transfer ID and a same access type to be the access commands in a dependency relationship.

Apparatus Operation

FIG. 5 is an explanatory diagram illustrating a constraint of a refresh specifying a bank in LPDDR4. Although LPDDR4 allows for a refresh specifying a bank, there is a constraint on the order of banks to be specified. Although LPDDR4 allows for specifying a bank for which a refresh is to be performed, it is necessary to equally perform refresh for each bank. Accordingly, there is a constraint that the second refresh cannot to be issued to any bank without completing one refresh on all the banks. With regard to a certain bank in a DRAM of 8-bank configuration, a refresh on the same bank, in the shortest timing, can be performed consecutively twice (timing 500). However, in a case where refresh is performed on the same bank consecutively twice as described above, the next refresh for that bank will be eight times later in the shortest timing (timing 501).

FIG. 6 is a diagram illustrating an example of a refresh management table. The refresh management table is used to satisfy the constraint on refresh specifying a bank in the LPDDR4 described above. As illustrated in FIG. 6, it is configured such that when a refresh of a certain bank is issued, a flag of the bank is set (flag=1), and a bank to be refreshed next is selected from banks for which a flag is not set (flag=0). In a case where a refresh is issued to all the banks and the flags of all the banks are set (flag=1), the flags of all the banks are reset, and the banks come to be in a state in which a refresh can be issued to all the banks.

Figure 7:
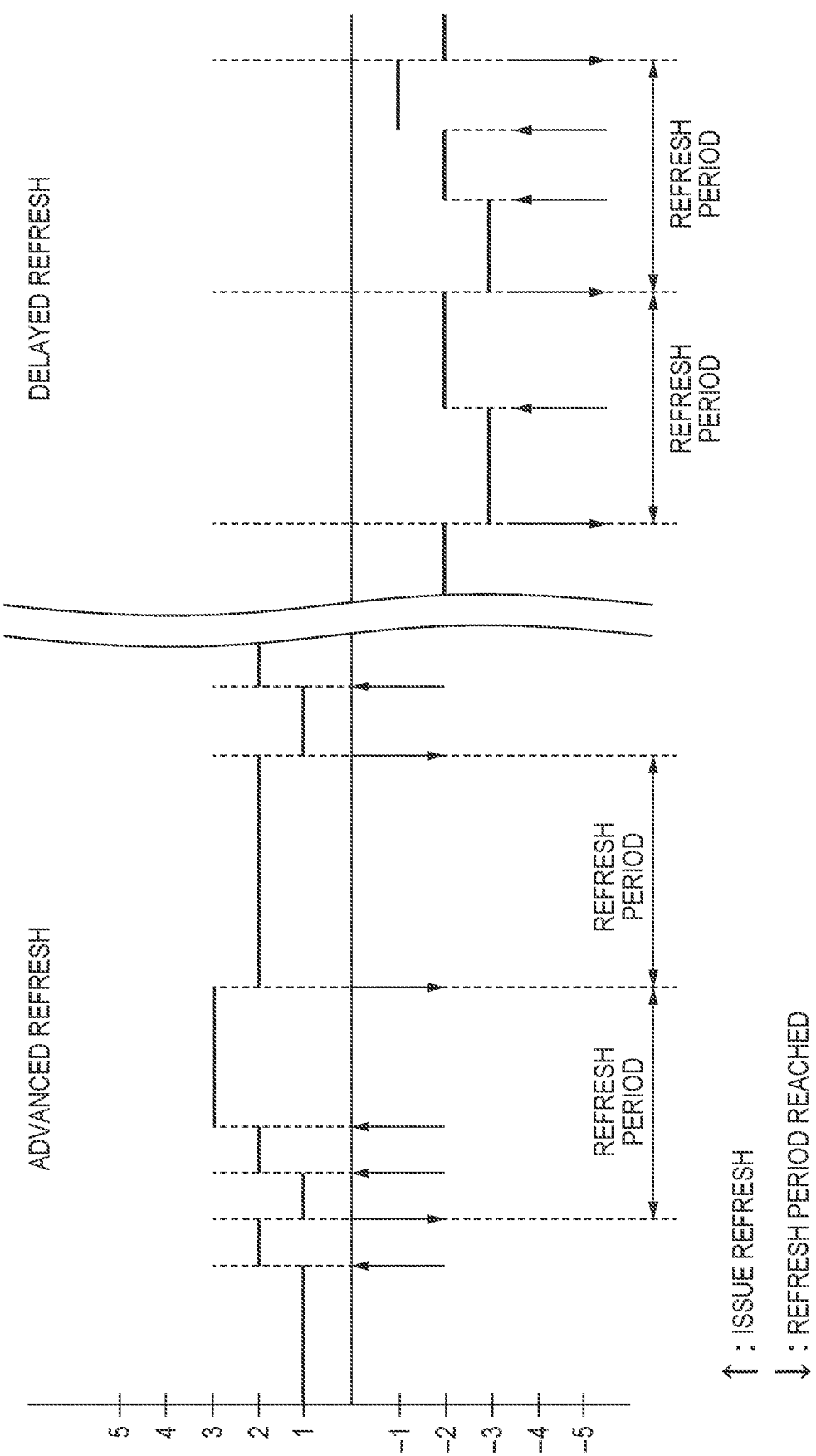
FIG. 7 is an explanatory diagram illustrating a refresh state counter according to the first embodiment.

FIG. 7 is an explanatory diagram illustrating a refresh state counter included in the refresh generation unit 307. The refresh state counter is a counter for detecting whether the status of refresh issuance to the DRAM is an ahead-of-time refresh state or a delayed refresh state. The horizontal axis of FIG. 7 indicates that time elapses in the rightward direction. As time elapses, a timing at which a refresh command is issued to the DRAM 301 is indicated by an upward arrow, and a timing at which a periodic time of issuing a refresh command has elapsed is indicated by a downward arrow. The vertical axis of FIG. 7 indicates changes over time of the count value of the refresh state counter. The refresh state counter is configured to count up when a refresh command is issued to the DRAM and to count down when a refresh period has elapsed. Therefore, a case where the counter value indicates a positive value is an ahead-of-time refresh state, and a case where the counter value indicates a negative value is a delayed refresh state.

Figure 8:
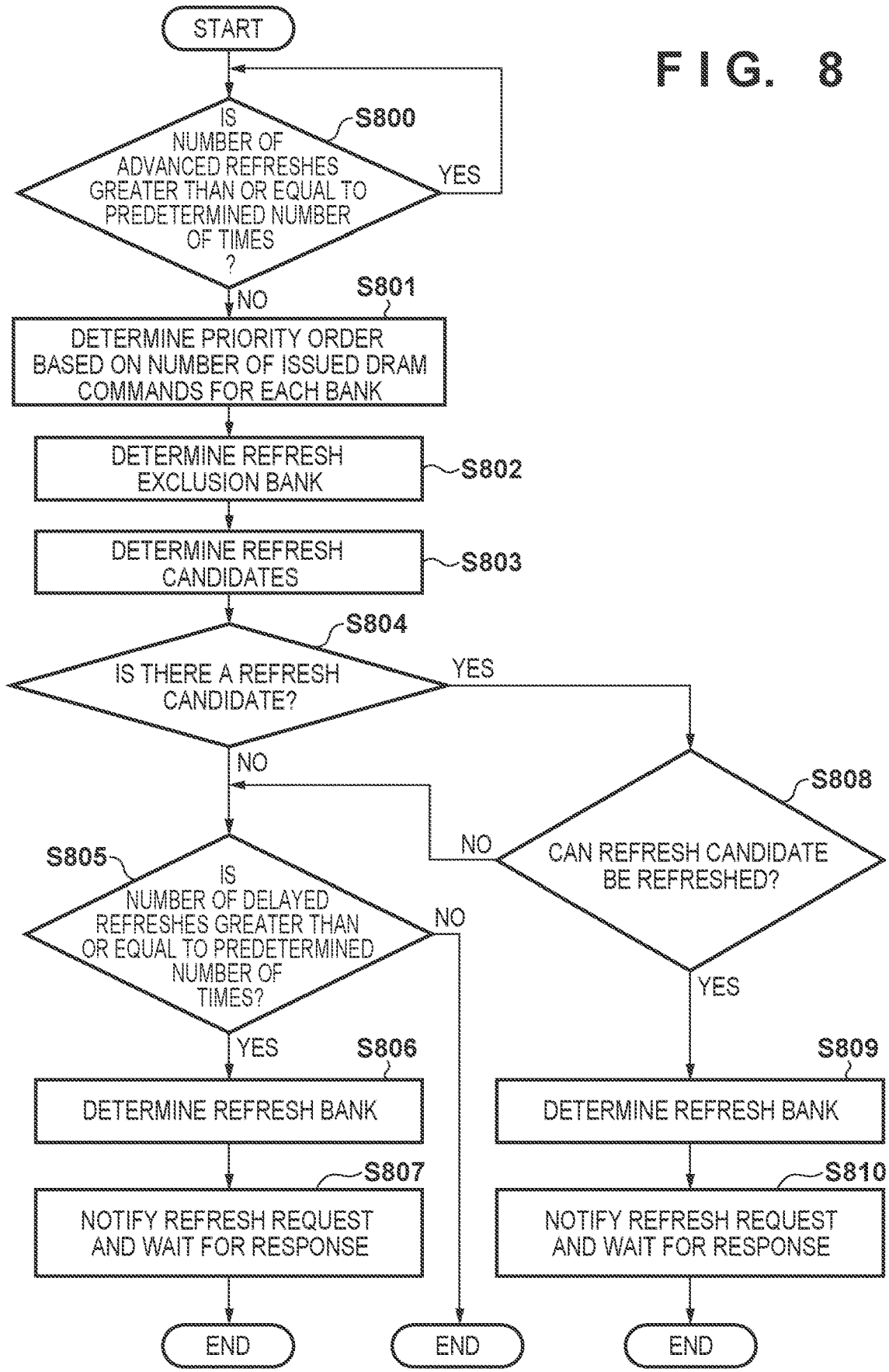
FIG. 8 is a flowchart of generating a refresh request according to the first embodiment.

FIG. 8 is a flowchart illustrating generation processing of a refresh request performed by the refresh generation unit 307 according to the present embodiment. In order to select a bank to be a refresh target not degrading the performance of memory access, the refresh generation unit 307 judges the dependency relationship between accesses from the attribute information associated with memory access and narrows down to a bank to be a refresh target. In exemplary processing described below, the refresh generation unit 307 acquires the number of commands for each bank based on the access commands held in the command storage unit 303 and selects a bank to be a refresh candidate based on the acquired number of commands. Subsequently, the refresh generation unit 307 further narrows down the refresh candidates, based on the dependency relationship judged with respect to the access commands.

At S800, the refresh generation unit 307 judges whether or not the number of ahead-of-time refreshes is equal to or larger than a predetermined number, and repeats the judgment in a case where the number of ahead-of-time refreshes is equal to or larger than the predetermined number. In a case where the number of ahead-of-time refreshes falls below the predetermined number, the processing proceeds to S801. This is because the number of ahead-of-time refreshes is defined, by the DRAM specification, to be smaller than a predetermined number, and it is necessary to stop refresh when the number of ahead-of-time refreshes reaches or exceeds the predetermined number. Note that the refresh generation unit 307 recognizes whether the current status of refresh issuance is in an ahead-of-time refresh state or in a delayed refresh state, according to the refresh state counter, as described above. In a case where the counter value of the refresh state counter is a positive value, the counter value is used as the number of ahead-of-time refreshes.

S801 to S803 are exemplary processing for the refresh generation unit 307 to determine a refresh candidate. At S801, the refresh generation unit 307 selects banks to be a refresh target (refresh candidates) based on the number of DRAM commands for each bank, and it determines the priority order. More specifically, the refresh generation unit 307 calculates, for each bank, the total number of commands, from address information and transfer length information of the access commands stored in the command storage unit 303. Here, the number of commands is a number calculated by considering the transfer length of the access commands, details of which will be described below. The refresh generation unit 307 selects banks that is a refresh candidate, based on the number of commands obtained by the calculation, and determines the priority order. Selection of refresh candidates and determination of the priority order based on the number of commands will be described below, referring to FIG. 9.

At S802, the refresh generation unit 307 determines a bank to be excluded from refresh, from among the banks selected as refresh candidates at S801 (banks provided with the priority order), based on the dependency relationship between access commands judged by the dependency relationship judgment unit 305. In other words, a refresh will not be performed on a bank including an access command having a dependency relationship with another bank.

At S803, the refresh generation unit 307 determines refresh candidates. More specifically, the refresh generation unit 307 determines, as refresh candidates, the remaining banks by excluding the bank determined to be the bank to be excluded from refresh at S802, from among the refresh candidates (banks provided with a priority order) selected at S801. The refresh generation unit 307 thus determines refresh candidates based on the total number, for each bank, of read commands and write commands of with respect to other banks (banks other than banks of interest), and the dependency relationship between access commands. For the processing from S801 to S803 described above, a specific example will be described below, referring to FIG. 9.

At S804, the refresh generation unit 307 judges whether or not there is a refresh candidate. When it is judged that there is a refresh candidate (YES at S804), the processing proceeds to S808. When, on the other hand, it is judged that there is no refresh candidate (NO at S804), it is necessary to judge whether to wait to issue a refresh or issue a refresh, and therefore the processing proceeds to S805.

At S805, the refresh generation unit 307 judges whether or not the number of delayed refreshes is equal to or larger than a predetermined number by referring to the refresh state counter. This is because the number of delayed refreshes is defined by the DRAM specification. In a case where a counter value of the refresh state counter is a negative value, this counter value is used as the number of delayed refreshes. When it is judged that the number of delayed refreshes is equal to or larger than the predetermined number (YES at S805), the processing proceeds to S806. When, on the other hand, it is judged that the number of delayed refreshes is smaller than the predetermined number (NO at S805), it is not necessary to promptly issue a refresh command, and therefore the refresh generation unit 307 terminates the processing without generating a refresh request.

At S806, the refresh generation unit 307 determines a refresh bank. The refresh generation unit 307 checks the refresh management table described in FIG. 6, selects one bank from the banks each of which is not set with the flag (flag=0), and determines the selected bank to be the refresh bank. At S807, the refresh generation unit 307 generates a refresh request for the refresh bank, notifies the command issuance unit 304 of the refresh request, and waits for a response from the command issuance unit 304. Upon receiving the refresh request, the command issuance unit 304 notifies the refresh generation unit 307 of a response to the refresh request, and it issues a refresh command for the refresh bank. The refresh generation unit 307 terminates the processing in response to the notification of the response from the command issuance unit 304.

At S808, the refresh generation unit 307 judges whether or not a refresh is possible to the refresh candidate. In other words, the refresh generation unit 307 checks the refresh management table described by FIG. 6, and judges that refresh is possible to a refresh candidate corresponding to the bank to which flag is not set (flag=0) among the refresh candidates determined at S803. In a case where it is judged that a refresh is possible to at least one refresh candidate (YES at S808), the processing proceeds to S809. In a case where, on the other hand, it is judged that refresh is not possible to any refresh candidate, i.e., when all the refresh candidates are judged that a refresh is not possible (NO at S808), the processing proceeds to S805 in order to judge whether or not it is necessary to issue a delayed refresh request. The processing performed at and after S805 is as described above.

At S809, the refresh generation unit 307 determines a refresh bank to be a refresh target from among the refresh candidates which are judged that refresh is possible. For example, the refresh candidate of the highest priority order, which is provided to the refresh candidate, may be determined as the refresh bank. At S810, the refresh generation unit 307 generates a refresh request for the refresh bank determined at S809, notifies the command issuance unit 304 of the refresh request, and waits for a response from the command issuance unit 304. The processing at S810 is similar to the processing at S807. Upon receiving a response from the command issuance unit 304, the refresh generation unit 307 terminates the present processing.

FIG. 9 is an explanatory diagram illustrating a specific example of a method of determining a refresh candidate (processing from S801 to S803) by the refresh generation unit 307. The refresh generation unit 307 calculates, for each bank, a total number 902 of read commands and write commands from address information and transfer length information of the access commands stored in the command storage unit 303. In addition, the refresh generation unit 307 calculates, for each bank, a total number 903 of read commands and write commands for other banks. The total number 903 of commands for other banks is obtained by subtracting, for example, from an additional value obtained by adding, for all the banks, the total number 902 of the commands for each bank, the total number 902 of commands for the bank of interest. In the example of FIG. 9, for example, the total number 902 of read commands and write commands that access the bank 0 is "5", and the total number 903 of read commands and write commands that access other banks (other than the bank 0 (i.e., banks 1 to 7)) is "54". Here, the total number 902 and the total number 903 are the sum of respective numbers of commands of read and write, in which the transfer length of access commands is reflected to the number of commands. In the present embodiment, it is counted by 16 bursts per one access command (2 bytes/burst), and thus, for example, an access command having a transfer length of 64 bursts is counted as four commands (64/16=4). In other words, the number of commands of access commands having a transfer length of 16 is 1, and the number of commands of access commands having a transfer length of 64 is 4. The number of commands corresponds to a time length required for execution of the access command.

The refresh generation unit 307 selects a refresh candidate and determines a priority order 904, based on the total number 903. In the present embodiment, a bank having the total number 903 being equal to or larger than a predetermined number is selected as a refresh candidate. For example, let the number of read commands and write commands be N, which can be issued to other banks in parallel during execution of refresh to a certain bank. In this case, when a bank having the total number 903 of read commands and write commands for other banks being equal to or larger than N is set to be a refresh bank, read commands and write commands for other banks can be issued continuously in parallel with a refresh. In other words, it is possible to suppress degradation of the memory access performance caused by the refresh. Accordingly, a bank having the total number 903 of read commands and write commands for other banks being equal to or larger than N is selected as a refresh candidate. In the present example, the predetermined number N is set as N=50, and a bank having the total number 903 of commands for the other banks being equal to or larger than "50" is set as a refresh candidate.

Here, refresh candidates (banks having the total number 903 of commands for other banks being equal to or larger than "N=50") are provided with the priority order 904 in descending order of the total number 903 of commands for other banks. In the example of FIG. 9, the priority order for a "bank 2" having the largest total number 903 of commands for other banks is the highest among the refresh candidates. The priority order of a "bank 3" having the smallest total number 903 is the lowest among the refresh candidates. Here, banks 1, 4, and 7 having the total number 903 being smaller than "50" are not selected as refresh candidates, and therefore the priority order 904 is not provided to these banks. This is because, if a refresh is performed to these banks, there is a possibility that all the read commands and write commands that can be issued to other banks may be issued in the middle of a refresh, and read commands and write commands can no longer be issued until the refresh under the execution is completed.

The dependency relationship judgment unit 305 judges presence or absence of dependency between access commands by checking the access type 401 and the transfer ID 406 for each bank. In the example of FIG. 9, an access command in which access type is "read" and transfer ID is "0" is included in the bank 0 and the bank 5. And thus, the dependency relationship judgment unit 305 judges that there is a dependency relationship between the access commands of the bank 0 and the bank 5. Access commands judged to have a dependency relationship must be issued in the order of reception, and therefore the refresh generation unit 307 excludes the bank with access commands having a dependency relationship from the refresh candidates (exclusion target bank 905). As such, the dependency relationship judgment unit 305 notifies the refresh generation unit 307 of banks with access commands having a dependency relationship, and the refresh generation unit 307 judges the exclusion target bank 905 based on the notification.

The refresh generation unit 307 excludes the bank specified as the exclusion target bank 905 from the banks provided with the priority order 904, and it determines the remaining banks as refresh candidates. The refresh generation unit 307 then determines refresh priority 906 for the determined refresh candidates in accordance with the priority order 904. As such, the "bank 2", "bank 3" and "bank 6" having no dependency relationship, and having the total number 903 of commands for other banks exceeding 50 are selected as the final refresh candidates. In addition, the priority of the refresh candidates (refresh priority 906) is in order of "bank 2", "bank 6" and "bank 3" according to the priority order 904 (descending order of the total number 903 of commands for other banks).

Although the priority is provided to the refresh candidates of the bank 2, the bank 3 and the bank 6 in the example of FIG. 9, the memory access performance will not be degraded when the refresh is issued to any one of these three banks. Therefore, it is not necessary to provide priority to the refresh candidates of the bank 2, the bank 3 and the bank 6. Although a case of using the dependency relationship (dotted line 407 in FIG. 4) judged based on the transfer ID and the access type has been described in the example of FIG. 9, the dependency relationship indicated by the dotted line 408 in FIG. 4 may also be used. In the case of the dependency relationship indicated by the dotted line 408, access commands, in which transfer IDs coincide regardless of the access type, are judged to have a dependency relationship, and therefore the bank 4 is also judged as a bank to be excluded in FIG. 9, for example. Noted that, in FIG. 9, the total number 903 of the bank 4 is smaller than "50" and thus it is not selected as a refresh candidate, therefore the refresh priority 906 is not changed when the dependency relationship indicated by the dotted line 408 is used.

Here, when the buffer of the command storage unit 303 becomes empty, that is a state of no memory access, and thus it is not necessary to consider the degradation of the memory access performance caused by the refresh and therefore all the banks may be selected as refresh candidates.

A procedure has been described above, in which refresh candidates are selected at S801 based on the number of commands, subsequently at S802, the banks to be excluded is further selected from the refresh candidates selected based on the dependency relationship. However, the present invention is not limited thereto, and a refresh candidate may be selected based on the number of commands from the banks from which the dependency relationship is excluded, for example.

Figure 10:
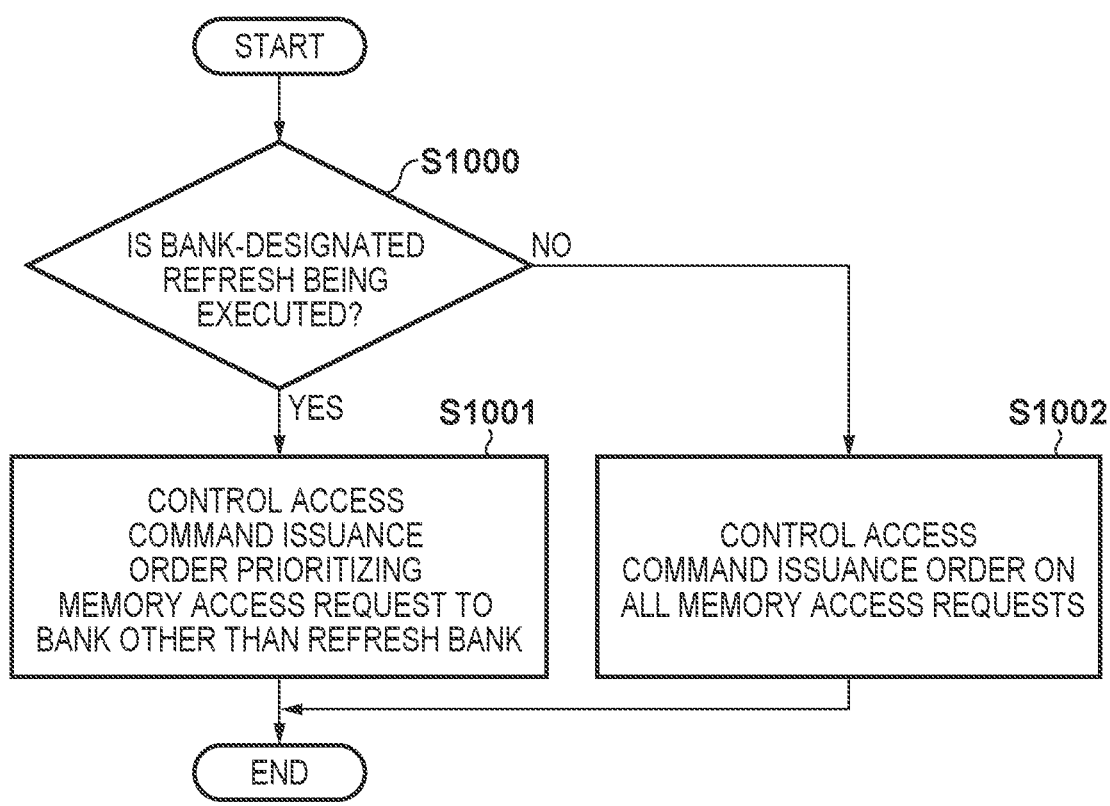
FIG. 10 is a flowchart of an issuance order control for access commands according to the first embodiment.

FIG. 10 is a flowchart of the issuance order control for access commands in the DRAM control apparatus 300. The DRAM control apparatus 300 can have a function of changing the order of the received memory access requests (issuance order control function). The issuance order control function can be used for the purpose of improving the efficiency of DRAM access, or for the purpose of realizing memory access requests in accordance with degree of urgency. The present embodiment therefore switches the controlling methods for the issuance order of memory access requests, depending on whether or not a refresh in which specifying a bank is being executed. The processing illustrated in FIG. 10 is started when the command issuance unit 304 is notified that an access command is stored, or in a case where the state of the DRAM is changed due to an issuance of a DRAM command.

At S1000, the command storage unit 303 judges whether or not the refresh specifying a bank is being executed, by monitoring refresh requests and responses between the refresh generation unit 307 and the command issuance unit 304. It is needless to say that the method of recognizing whether or not refresh specifying a bank is being executed is not limited thereto, and the command storage unit 303 may recognize whether or not refresh specifying a bank is being executed based on the state of the command issuance unit 304. When it is judged that the refresh specifying a bank is being executed (YES at S1000), the processing proceeds to S1001, or the processing proceeds to S1002 when it is judged that the refresh specifying a bank is not being executed (NO at S1000).

At S1001, the command storage unit 303 controls to prioritize memory access requests to banks other than the refresh bank in the issuance order control for access commands. For example, the command storage unit 303 controls memory access requests for the refresh bank not to be output to the command issuance unit 304. At S1002, the command storage unit 303 performs control for the issuance order targeting all the memory access requests, in the issuance order control for access commands. Note that, although in the issuance order control for access commands, memory access request that does not degrade the memory access performance is prioritized, memory access request of high degree of urgency may be prioritized.

According to the present embodiment, as has been described above, refresh specifying a bank is performed by selecting a bank that does not affect memory access. In addition, the order of memory access requests may be changed according to the status of refresh execution. Here, the issuance order of access commands having a dependency relationship is controlled to be performed in the order of the memory access requests being received.

According to the first embodiment as has been described above, a bank of refresh candidate is determined and refresh specifying a bank is performed such that the bank performed by memory access and the refresh bank do not overlap with each other. The foregoing configuration allows for preventing accesses having a dependency relationship from being disturbed by the refresh, whereby more efficient memory access can be realized. In other words, it becomes possible to suppress the degradation of the memory access performance caused by the refresh.

Second Embodiment

In the following, a second embodiment will be explained, taking a DRAM control apparatus that controls DRAM access conforming to the LPDDR5 standard as an example of the memory control apparatus.

In the DRAM conforming to the LPDDR5 standard, a Refresh Management Command (RFM command) is added in addition to the periodically issued conventional Refresh command (Ref command). A Rolling Accumulated ACT (RAA) is counted for each bank of DRAM or each region called a bank group, and the refresh management command is issued in accordance with a count number of the RAA. In the following, a bank and a bank group will be collectively referred by an expression of a bank.

Figure 11:
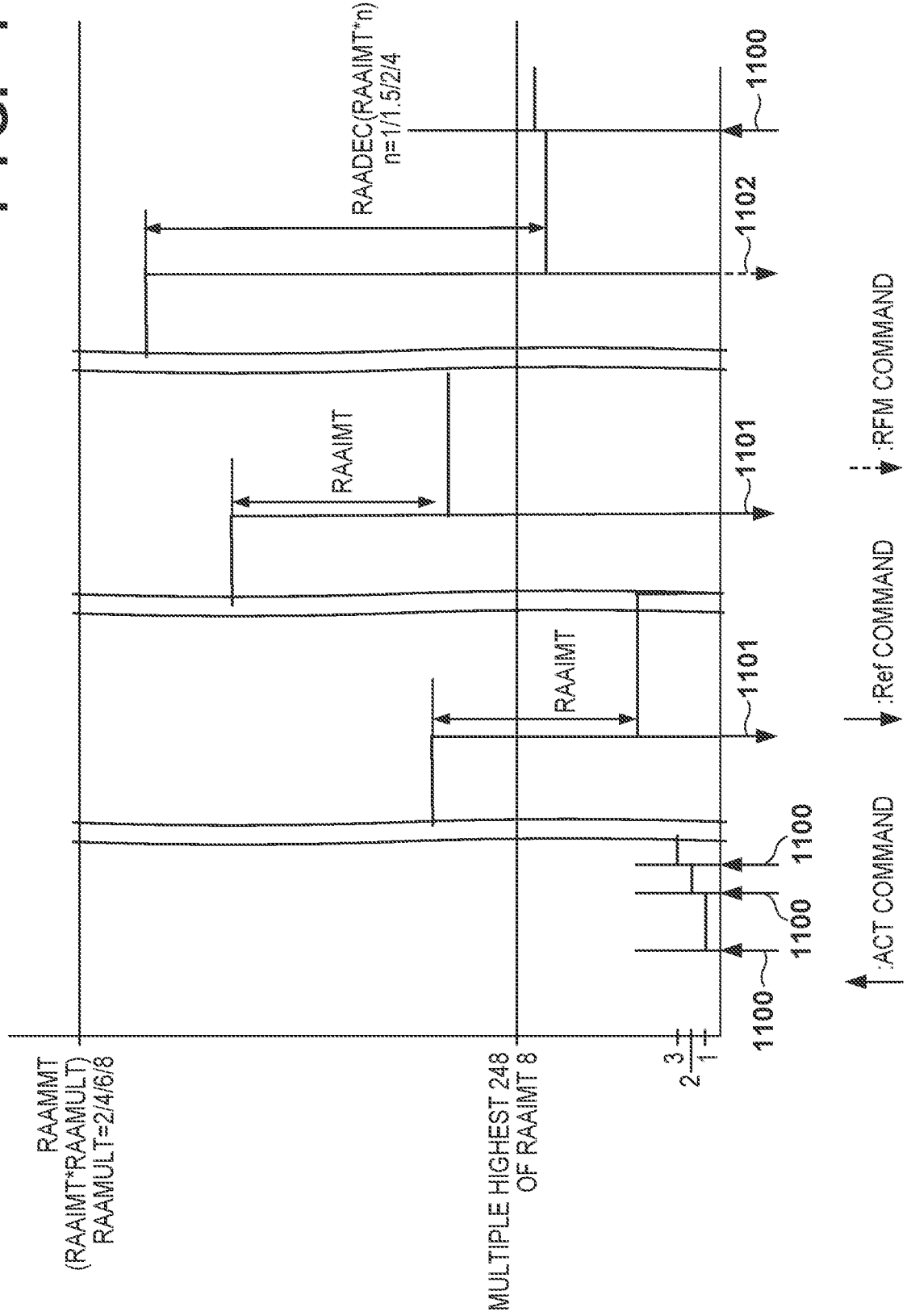
FIG. 11 is an explanatory diagram illustrating an RAA count.

FIG. 11 is an explanatory diagram illustrating counting operation of an RAA by an RAA counter. The RAA count counted by the RAA counter is incremented by 1 each time an ACT command is issued to a target bank (1100). When a Ref command is issued, the RAA count is decremented by an RAA Initial Management Threshold (RAAIMT) (1101).

The RAAIMT is a multiple of 8, and the maximum value of the RAAIMT is 248. When the RFM command is issued, the RAA count is decremented by an RAA Count Decrement per RFM Command (RAADEC) (1102). The RAADEC is given by RAAIMT*n (n being any of 1, 1.5, 2, and 4).

Although not illustrated, the minimum value of the RAA count is 0, and thus in a case where the subtraction value is larger than the RAA count value, the RAA count after the subtraction is 0. In addition, when the RAA count reaches an RAA Maximum Management Threshold (RAAMMT), the ACT command can no longer be issued to the DRAM, and therefore the RAA count will not exceed the RAAMMT. The RAAMMT is given by RAAIMT*RAAMULT (RAAMULT being any of 2, 4, 6 and 8).

As such, in a case where the number of ACT commands issued within the issuance period of the Ref command is smaller than the RAAIMT, the RAA count periodically returns to 0 and never reaches the RAAMMT. However, as the number of ACT commands increases, the increase in the RAA count can no longer be suppressed only by subtraction of the RAA count by the Ref command, and the RAA count may reach the RAAMMT. When the RAA count reaches RAAMMT, the ACT command can no longer be issued, and the memory access to the bank is prevented, and therefore the memory access performance is degraded. In order to avoid the foregoing problem, the DRAM control apparatus can issue an RFM command to decrement the RAA count when the RAA count reaches the RAAIMT.

Figure 12:
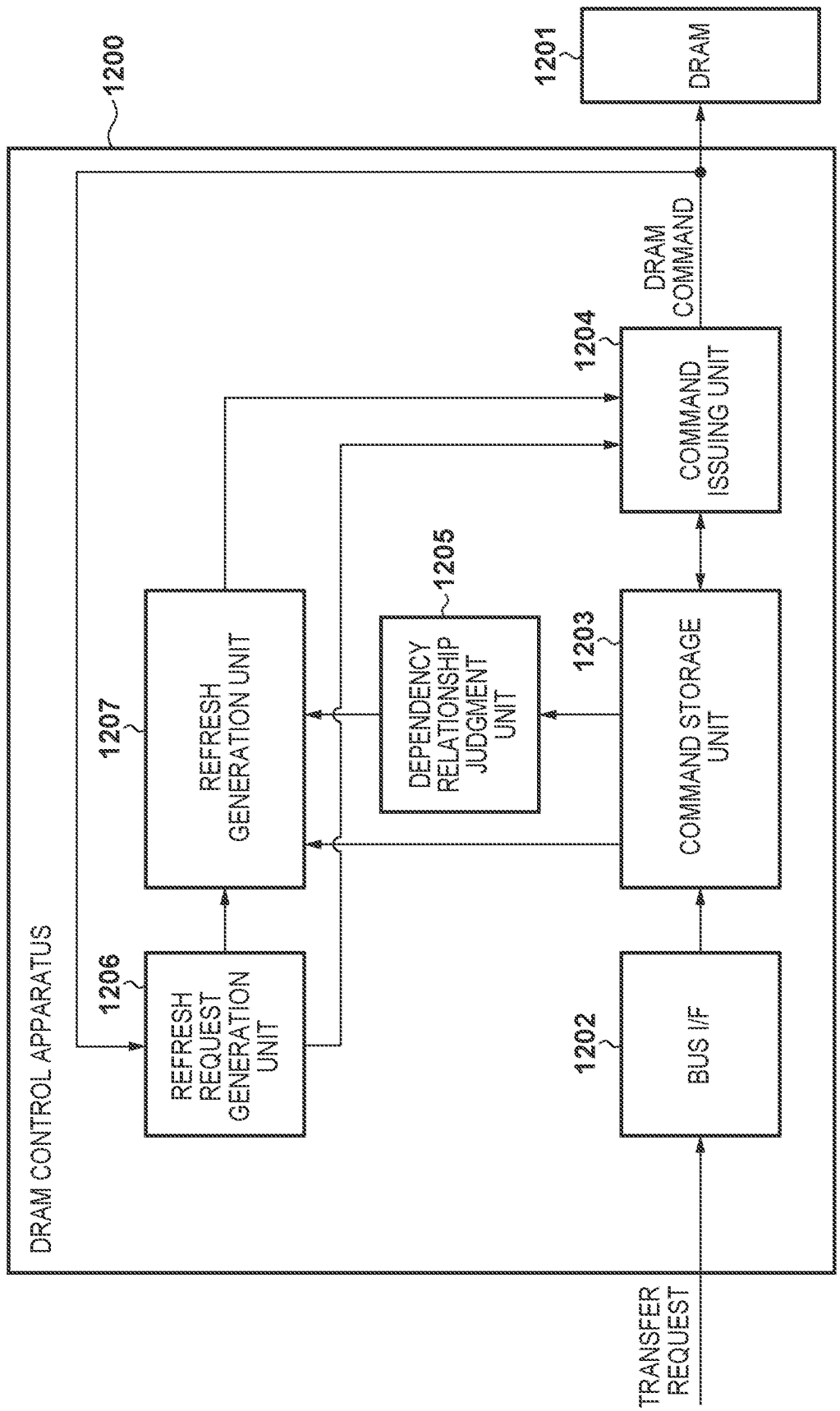
FIG. 12 is a diagram illustrating a configuration of a DRAM control apparatus according to a second embodiment.

FIG. 12 is a diagram illustrating a configuration example of a DRAM control apparatus according to the present embodiment. A DRAM control apparatus 1200 issues a DRAM command to the DRAM 1201 in response to a memory access request issued by an initiator (not illustrated).

A bus interface (referred to as a bus I/F in the following) 1202 receives a memory access request issued by the initiator, converts the memory access request into an access command in row address units specifying a region referred to as a page of the DRAM 1201, and transmits the access command to a command storage unit 1203. The command storage unit 1203 includes a buffer configured to hold a plurality of access commands generated by the bus I/F 1202. When the access command is stored in the buffer, the command storage unit 1203 notifies a command issuance unit 1204 that command transmission is ready, and in response to a response from the command issuance unit 1204, the command storage unit 1203 transmits the access command to the command issuance unit 1204. Here, the command storage unit 1203 may be configured to change the order of the received memory access requests, for the purpose of improving the efficiency of DRAM access or realizing memory access requests depending on the degree of urgency. Such a change of the order of memory access requests can be realized by, for example, changing the order of storing the access commands in the buffer.

A dependency relationship judgment unit 1205 monitors the access commands stored in the command storage unit 1203 and judges a dependency relationship between access commands. The dependency relationship between access commands has been described above referring to FIG. 4. A refresh request generation unit 1206 is a timer that counts an elapsed time of an average refresh period and notifies the elapsed time of the average refresh period to a refresh generation unit 1207. Furthermore, the refresh request generation unit 1206 monitors the DRAM command issued by the command issuance unit 1204, counts the RAA count illustrated in FIG. 12 for each bank, and notifies the RAA count value to the command issuance unit 1204 and the refresh generation unit 1207. The refresh generation unit 1207 generates a refresh request specifying bank and a refresh management request specifying bank, based on information received from the dependency relationship judgment unit 1205 and the refresh request generation unit 1206. In the following, a refresh request will be referred to as a Ref request, and a refresh management request will be referred to as an RFM request. In a case where both a Ref request specifying bank and an RFM request specifying bank are generated simultaneously, the bank information included in the Ref request and the bank information included in the RFM request are compared. When the Ref request and the RFM request indicate a same bank, only the Ref request is notified to the command issuance unit 1204. When the Ref request and the RFM request indicate different banks, both requests are notified to the command issuance unit 1204.

The command issuance unit 1204 generates a DRAM access command for accessing the DRAM 1201, from the access command in row address units received from the command storage unit 1203. In addition, the command issuance unit 1204 generates a refresh command or a refresh management command for the DRAM 1201, in response to the Ref request for each bank or the RFM request for each bank generated by the refresh generation unit 1207. In addition, the command issuance unit 1204 adjusts the timings of issuing the DRAM access command, the refresh command, and the refresh management command and then issues the DRAM command to the DRAM 1201. In addition, the command issuance unit 1204 receives the RAA count value from the refresh request generation unit 1206, and in a case where the RAA count has reached the RAAMMT, the command issuance unit 1204 does not issue the ACT command to the bank.

The generating processing of the Ref request specifying bank by the refresh generation unit 1207 is identical to that described in the first embodiment referring to FIG. 8. That is, the refresh generation unit 1207 includes a refresh state counter configured to count the difference between a number of times that the refresh period was reached and a number of times that the Ref command was issued, as described referring to FIG. 7. The refresh generation unit 1207 then generates the Ref command, based on the count value of the refresh state counter, the number of commands for each bank based on the access command, and the dependency relationship judged for the access command. Note that, in the present embodiment, it is also possible, by the generation processing of the RFM request described below, to suppress degradation of the memory access performance caused by refresh. Therefore, in the present embodiment, the Ref command may be generated by selecting an arbitrary refresh bank based on the refresh state counter without using the number of commands or the dependency relationship based on access commands. In the following, generation processing of the RFM request specifying bank by the refresh generation unit 1207 will be described in detail, referring to FIG. 13 and FIG. 14.

Figure 13:
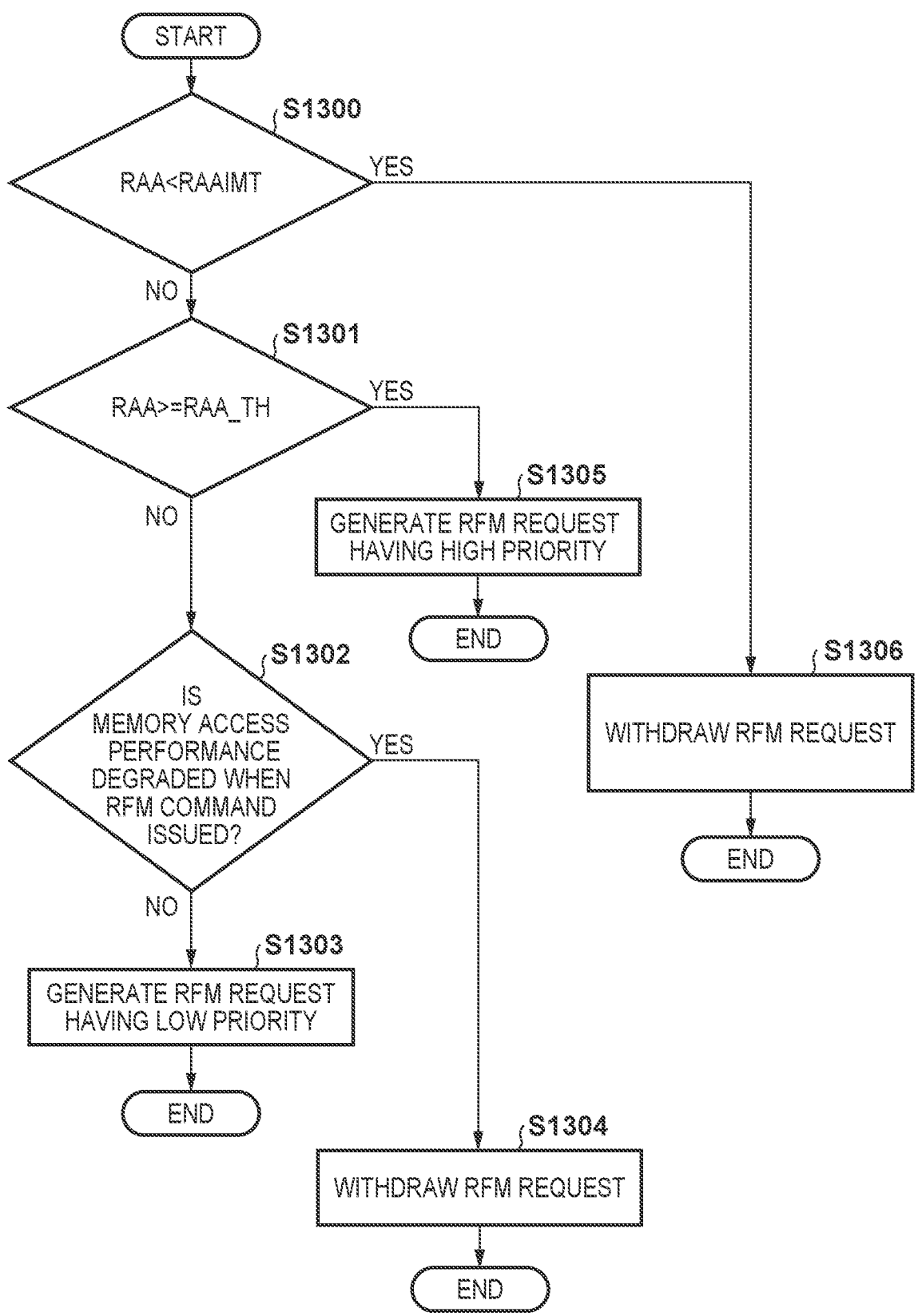
FIG. 13 is a flowchart of generating RFM requests for each bank according to the second embodiment.

FIG. 13 is a flowchart illustrating the generation processing of the RFM request for each bank by the refresh generation unit 1207. The refresh generation unit 1207 receives the RAA count value for each bank from the refresh request generation unit 1206, and it compares the RAA count with the RAAIMT (S1300). In a case where the RAA count is smaller than the RAAIMT (YES at S1300), the refresh generation unit 1207 withdraws the RFM request (S1306). When, on the other hand, the RAA count is equal to or larger than the RAAIMT (NO at S1300), the refresh generation unit 1207 compares the RAA count with an RAA_TH (S1301). The RAA_TH, which is a parameter to be set in the DRAM control apparatus, is preliminarily set with a value equal to or larger than the RAAIMT and equal to or smaller than the RAAMMT (RAAIMT≤RAA_TH-≤RAAMMT).

In a case where the RAA count value is equal to or larger than the RAA_TH (YES at S1301), the refresh generation unit 1207 generates an RFM request having high priority (S1305). In a case where the RAA count value is smaller than the RAA_TH (NO at S1301), the refresh generation unit 1207 judges whether or not the memory access performance is degraded when the RFM command is issued (S1302). The judgment mentioned here is as described in the first embodiment referring to FIG. 9. In other words, it is judged whether or not the time required for refresh management can be filled by command issuance for other banks, based on the dependency relationship between transfer requests and the total number of commands for other banks. Note that, when the buffer of the command storage unit 303 becomes empty, that is a state of no memory access, and therefore it is also judged that there is no degradation of the memory access performance caused by the RFM issuance.

When it is judged that issuance of the RFM command does not degrade the memory access performance (NO at S1302), the refresh generation unit 1207 generates an RFM request having low priority (S1303). When it is judged that issuance of the RFM command degrades the memory access performance (YES at S1302), the refresh generation unit 1207 withdraws the RFM request (51304).

Figure 14:
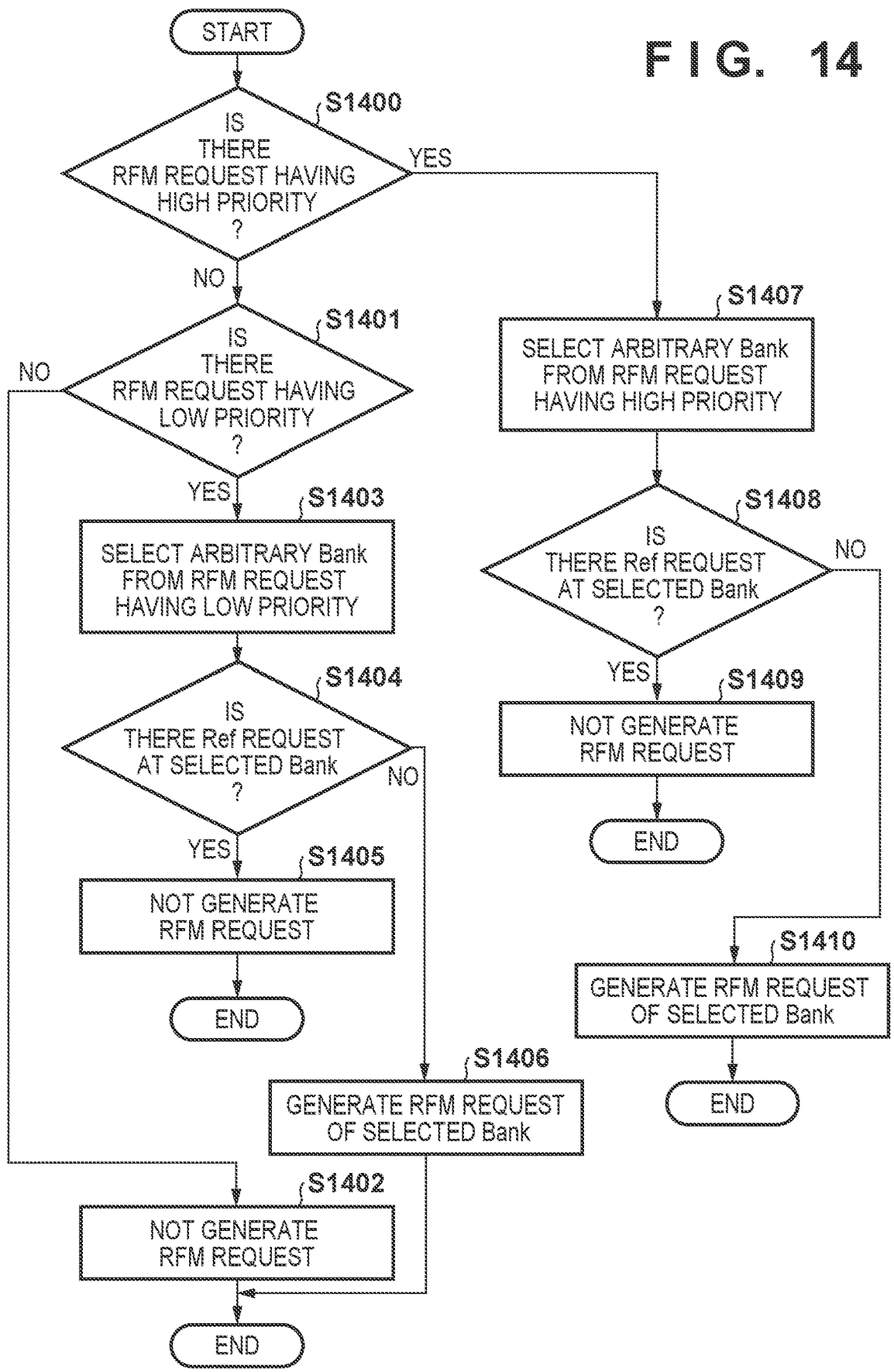
FIG. 14 is a flowchart of selecting the RFM request generated for each bank according to the second embodiment.

FIG. 14 is a flowchart illustrating the selecting processing of the RFM request generated for each bank by the processing illustrated in FIG. 13. The refresh generation unit 1207 judges whether or not there is the RFM request having high priority among the RFM request generated for each bank (S1400). In a case where there is the RFM request having high priority (YES at S1400), the refresh generation unit 1207 selects an arbitrary bank from the banks corresponding to the RFM request having high priority (S1407). For example, a bank having the smallest bank number may be selected, or a bank having the largest RAA count value may be selected. Next, the refresh generation unit 1207 checks whether or not there is the Ref request for the bank selected at S1407 (S1408). When there is the Ref request (YES at S1408), the refresh generation unit 1207 does not generate the RFM request (S1409). When, on the other hand, there is no Ref request for the selected bank (NO at S1408), the refresh generation unit 1207 generates the RFM request for the selected bank (S1410).

In a case where there is no RFM request having high priority among the RFM request generated for each bank (NO at S1400), the refresh generation unit 1207 checks whether or not there is the RFM request having low priority (S1401). In a case where there is the RFM request having low priority (YES at S1401), the refresh generation unit 1207 selects an arbitrary bank from the banks corresponding to the RFM request having low priority (S1403). Similarly to the S1407, the bank having the smallest bank number may be selected, or the bank having the largest RAA count value may be selected. Next, the refresh generation unit 1207 checks whether or not there is the Ref request for the bank selected at S1403 (S1404). When there is the Ref request for the selected bank (YES at S1404), the refresh generation unit 1207 does not generate the RFM request (S1405). When, on the other hand, there is no Ref request for the selected bank (NO at S1404), the refresh generation unit 1207 generates the RFM request for the selected bank (S1406).

The Ref request and the RFM request generated by the refresh generation unit 1207 as described above are transmitted to the command issuance unit 1204.

Here, the DRAM control apparatus 1200 can have a function of changing the order of the received memory access requests (issuance order control function), as has been described in the first embodiment, referring to FIG. 10.

According to the second embodiment as has been described above, refresh request specifying a bank and refresh management request specifying a bank are performed by selecting a bank that does not affect memory access. In addition, the order of memory access requests can be changed in accordance with the execution status of refresh or refresh management.

According to the second embodiment as has been described above, a bank of refresh candidate is determined and refresh request specifying a bank is performed such that the bank performed by memory access and the refresh bank do not overlap with each other. In addition, a bank of candidate for refresh management is determined and refresh management specifying bank is performed such that the bank performed by memory access and refresh management bank do not overlap with each other. This configuration allows for preventing accesses having a dependency relationship from being disturbed by refresh or refresh management, whereby more efficient memory access can be realized. In other words, it becomes possible to suppress degradation of the memory access performance caused by refresh or refresh management.

In the second embodiment, although the RAA count is described by using an up-counter that increments the count value each time an ACT command is issued in the description of FIG. 11, it may be configured by using a down-counter.

Alternatively, although it is described, in the illustration of FIG. 12 and FIG. 14, that the RFM request is withdrawn when there is the Ref request for the bank to which the RFM request is going to be issued, the Ref request may be withdrawn instead of withdrawing the RFM request. Alternatively, it may be determined whether the Ref request or the RFM request may be withdrawn, in accordance with the RAA count value.

According to the present invention, more efficient memory access can be realized.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066620, filed Apr. 14, 2023, and Japanese Patent Application No. 2023-210283, filed Dec. 13, 2023 which are hereby incorporated by reference herein in their entirety.

What is claimed is:

1. A memory control apparatus configured to control access to a DRAM including a plurality of banks, the memory control apparatus comprising:
    a first generation unit configured to generate an access command in response to an access request to the DRAM, and store the access command in a buffer;
    a second generation unit configured to generate a refresh request specifying a bank to the DRAM; and
    an issuance unit configured to issue a DRAM command to the DRAM, based on the access command stored in the buffer and the refresh request generated by the second generation unit, wherein
    the second generation unit determines a target bank of the refresh request from among banks remaining after excluding, from the plurality of banks, a bank that is an access target of the access command stored in the buffer and having a dependency relationship that needs to maintain issuance order.

2. The memory control apparatus according to claim 1, wherein the second generation unit selects banks of refresh candidate based on a number of commands for each of the plurality of banks, and determines a bank to which the refresh request is performed, from among banks remaining after excluding, from the banks of refresh candidate, a bank that is an access target of the access command in the dependency relationship.

3. The memory control apparatus according to claim 2, wherein the second generation unit selects, as the bank of refresh candidate, a bank having total number of commands for each of the plurality of banks excluding a bank of interest is equal to or larger than a predetermined number.

4. The memory control apparatus according to claim 1, wherein the second generation unit selects a bank of refresh candidate from the banks remaining, based on a number of commands of each of the banks remaining after excluding, from the plurality of banks, a bank that is an access target of the access command in the dependency relationship, and determines a bank to which a refresh request is performed from among the banks of refresh candidate.

5. The memory control apparatus according to claim 1, wherein the second generation unit judges the dependency relationship, based on attribute information included in the access command stored in the buffer.

6. The memory control apparatus according to claim 5, wherein
    the attribute information includes a transfer ID, and
    the second generation unit judges an access command having the dependency relationship, based on the transfer ID.

7. The memory control apparatus according to claim 5, wherein
    the attribute information includes a transfer ID and an access type, and
    the second generation unit judges an access command having the dependency relationship, based on the transfer ID and the access type.

8. The memory control apparatus according to claim 7, wherein the access type is either read access or write access.

9. The memory control apparatus according to claim 1, further comprising a control unit configured to control issuance order of access commands stored in the buffer, wherein
    the control unit excludes an access command targeting, as an access target, a bank for which a refresh is being executed, from a control target of the issuance order.

10. The memory control apparatus according to claim 1, wherein the second generation unit sets all banks as targets of the refresh request in a case where no access command is stored in the buffer.

11. The memory control apparatus according to claim 1, wherein the refresh request includes a request for issuing a refresh command and a request for issuing a refresh management command.

12. The memory control apparatus according to claim 11, wherein either the request for issuing a refresh command or the request for issuing a refresh management command is selected in a case where the request for issuing the refresh command and the request for issuing the refresh management command are simultaneously generated.

13. The memory control apparatus according to claim 12, wherein the second generation unit includes a refresh state counter configured to count a difference between a number of times that a refresh period has been reached and a number of times that a refresh command has been issued, and an RAA counter configured to count a Rolling Accumulated ACT, and the second generation unit generates a request for issuing the refresh command in accordance with a count value of the refresh state counter and generates a request for issuing the refresh management command in accordance with a count value of the RAA counter.

14. A memory control method performed by a memory control apparatus that controls access to a DRAM including a plurality of banks, the method comprising:
    generating an access command in response to an access request to the DRAM and storing the access command in a buffer;
    generating a refresh request specifying a bank to the DRAM; and
    issuing a DRAM command to the DRAM, based on the access command stored in the buffer and the refresh request generated at the second generation procedure, wherein,
    wherein a target bank of the refresh request is determined from among banks remaining after excluding, from the plurality of banks, a bank that is an access target of the access command stored in the buffer and having a dependency relationship that needs to maintain issuance order.

* * * * *